May 22, 1951     J. SLEPIAN ET AL     2,554,271

DEVICE FOR MEASURING THICKNESS OF COATINGS

Filed March 20, 1947

WITNESSES:
Robert C. Baird

INVENTORS
Joseph Slepian and
Bernard F. Langer.
BY
Paul E. Friedemann
ATTORNEY

Patented May 22, 1951

2,554,271

UNITED STATES PATENT OFFICE 2,554,271

DEVICE FOR MEASURING THICKNESS OF COATINGS

Joseph Slepian and Bernard F. Langer, Pittsburgh, Pa., assignors to Westinghouse Electric Corporation, East Pittsburgh, Pa., a corporation of Pennsylvania Application March 20, 1947, Serial No. 735,850

12 Claims. (Cl. 73—67)

Our invention relates to measuring devices and more particularly to devices for measuring the thickness of a relatively thin coating of a material on the surface of some other material.

Devices are available on the market for measuring the thickness of a non-magnetic coating on sheet steel, or wrought iron, or other metals or alloys having known magnetic properties. These devices make use of the great difference between the magnetic properties of the base material and the thin coating. These devices fail, however, when it is desirable to know, the thickness of tin plating on brass, or silver plating on copper, or any other combination of coating material on a base material.

One object of our invention is the provision for measuring the thickness of a coating material on a base material independent of the magnetic properties of the coating and base material.

A more specific object of our invention is the provision of measuring means for the measurement of the thickness of a coating on some base material that is responsive to the relative damping properties on a vibratory system of the sheet and coating.

A still more specific object of our invention is the provision of a vibratory system disposed in operative relation to a coated material whereby the vibration of the system is damped by the coating and material and the measure of the damping effect is thus a measure of the thickness of the coating on the base material.

Other objects and advantages of our invention will become more apparent from a study of the following specification and the drawing, in which.

Figure 1:
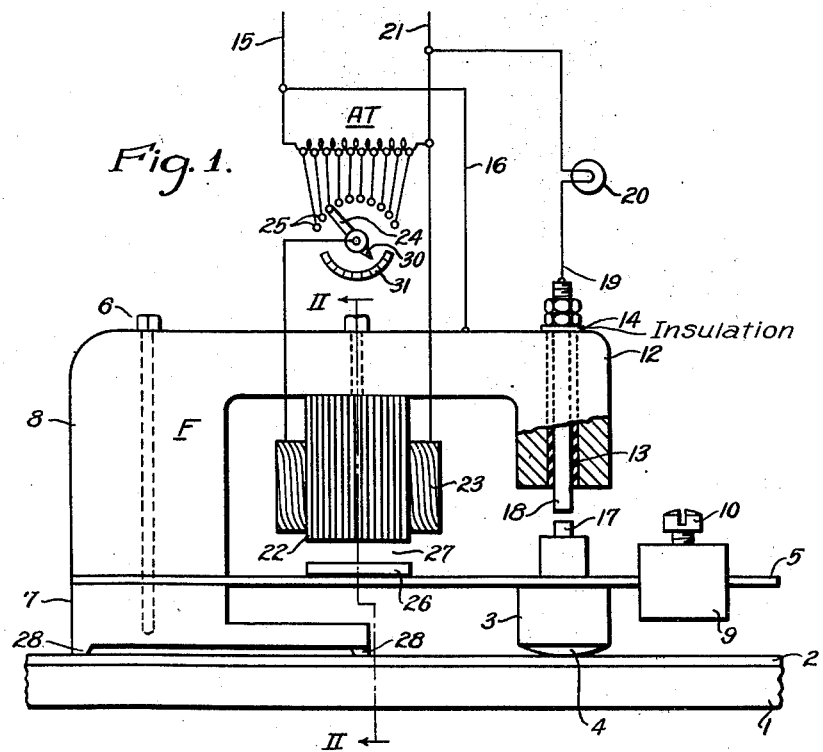
Figure 1 is a side view of our apparatus shown in relation to a coated base material.
Figure 2:
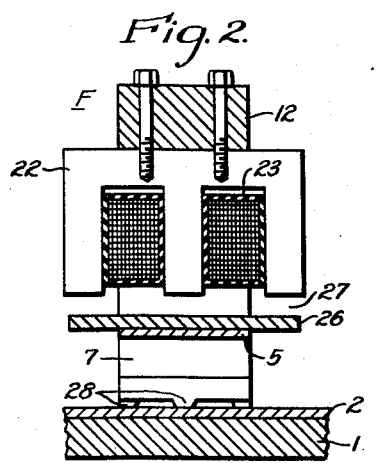
Fig. 2 is a sectional view on section line II—II of Fig. 1.
Figure 3:
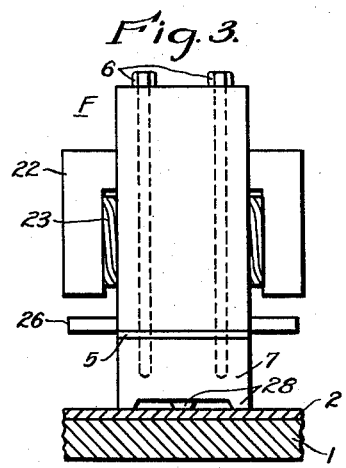
Fig. 3 is a rear view, a view from the left of the apparatus, as shown in Fig. 1.

The device described more in detail hereinafter makes use of the difference between the internal damping properties of the base sheet 1 and the coating 2, and, therefore, may be used for any combination, either metallic or non-metallic, in which the coating has considerably greater internal damping than the base material.

In the drawing, 1 designates the base material, such as brass, and 2 designates the coating plated on the brass, as, for example, tin plating.

A hardened steel block or hammer 3 having the generally spherical lower surface 4 is rigidly mounted on a flat spring 5. This spring at its aft end, or left-hand end as seen in Fig. 1, is rigidly clamped, by the bolts 6, between the base 7 and upper element 8 of the frame F. The right-hand end of the spring 5 carries a weight 9, the position of which may be adjusted longitudinally of the spring 5 and be held in its adjusted position by the set-screw, or lock bolt 10.

This spring 5, together with the weights 3 and 9 and armature 26 attached to it, constitutes a vibrating system, the natural frequency of which can be adjusted by means of the adjustment of the movable weight 9.

The upper end of the hammer 3 above the spring 5 is designed to terminate in an electric contact 17. Contact 17 is disposed in alignment with the electric contact 18. Contact 18 is mounted in the overhanging portion 12 of the frame and together with its terminal is insulated from the frame F by the sleeve and washer 13 and 14, both of insulating material. Terminals, or buses 15, 16, 19 and 21, comprise a supply of alternating current of suitable voltage and frequency. This supply is preferably of a standard 60 cycle 110 volt character. When contacts 17 and 18 engage under conditions explained hereinafter, a circuit is established from terminal 15 through conductor 16, frame F and the spring 5 and hammer 3 to contact 17, contact 18, terminal 19, signal lamp 20 to bus 21.

An E-shaped laminated magnetic structure 22 is rigidly secured to element 12 in the position and manner shown. The middle leg of the structure carries a coil 23. The coil terminals are connected to the terminals of a variable autotransformer AT which, in turn, has its outer terminals connected directly to the buses 15 and 21. The auto-transformer AT has a relatively large number of taps 25 so that the voltage supplied to the coil 23 may be effectively varied from a minimum when the arm 24 is in its extreme clockwise position to a maximum when the arm 24 is in its extreme counterclockwise position.

An armature 26 is disposed in operative relation to the electromagnet as shown. The flux produced in the magnetic circuit passes through the air-gap 27.

The geometrical arrangement of our device is such that when the three legs 28 are in firm contact with the coating 2, the spherical surface 4 of the block 3 just touches the sheet at the top surface of the coating 2 with no initial pressure. If the natural frequency of the vibrating system is so adjusted by weight 9 that it is 60 cycles when the device is not contacting the sheet, then the natural frequency will be 120 cycles when the device is held against the coated sheet. This will be so because the impact of the hammer 3 against the coated sheet will reverse the velocity of the vibrating elements in a negligible time. To keep the natural frequency independent of the amplitude, the spring force for the maximum deflection of the spring must be large compared to the gravity force acting on the weights. This means that the spring 5 is selected relatively stiff with reference to the weight of the hammer 3 and weight 9.

If the coil 23 is energized with 60 cycle current it exerts a force on the spring 5 which pulsates at the rate of 120 cycles per second. Since this magnetic force is in resonance with the natural frequency selected, the magnetic force will set up an amplitude of vibration in the vibrating system which is determined by the damping in the vibrating system. Most of the damping is due to the energy lost during impact, which, in turn, is dependent on the thickness of the coating. From this it is apparent that at resonance, namely, at maximum amplitude of vibration of the spring and weights, the amplitude of vibration is a measure of the thickness of the coating.

Since measuring of the amplitude at a fixed energy input to coil 23 is troublesome and may be complicated, we utilize the auto-transformer and by shifting the arm 24 vary the voltage applied to the coil. With this apparatus it thus becomes a simple matter to measure the voltage required to produce a certain amplitude. This amplitude is determined by contacts 17 and 18. When these contacts engage to energize the signal lamp 20, the given amplitude is produced.

The procedure is thus to place the device against the coated sheet as shown and then increase the magnet current gradually by movement of the arm 24 from the extreme clockwise position toward the extreme counterclockwise position until the signal light indicates that contacts 17 and 18 are striking. The voltage supplied to the coil can thus be read off by the position the pointer 30 holds with reference to the graduations 31. The higher the voltage the thicker the coating. In fact, for any given combination of coating and base material, the graduations can be calibrated in coating thickness provided the range in coating thickness is not too wide.

To obtain the most satisfactory use of our device certain design considerations must also be fulfilled:

(1) The spring force acting on the vibrating weights should, as already mentioned, be large compared to the gravity force, otherwise the hammer 3 will act like a bouncing ball and in consequence the natural period will depend on the amplitude.

(2) The scale of our device must be such that the impact stresses of the hammer 3 penetrate the coating to the base material. A pick-up of any given size is usable only with coatings of a certain thickness. As the coating thickness increases the device will become less and less sensitive. By increasing the scale of the device with an increase in coating thickness and thickness of the base sheet the requisite measurements can be made.

(3) The magnetic force produced by the coil 23 should be small enough to avoid having the armature 25 pull up and "freeze" against the core 22. The arrangement thus should be such that contacts 17 and 18 strike before the air gap 27 disappears. In short, the spacing between contacts 17 and 18 must be less by a safe margin than the air gap.

While we have shown but one embodiment of our invention, we do not wish to be limited to the exact showing made but wish to be limited only by the scope of the claims hereto appended.

We claim as our invention:

1. In a device for measuring the thickness of a coating on a base material, in combination, a base designed to be placed on a coated material, a vibratory system mounted on the base and having a natural period of vibration, the geometric disposition of the base and the vibrating system being such that when the base is placed on the coated material an element of the vibrating system contacts the coating with substantially no force, means for causing the vibrating system to vibrate to strike the coated material, and measuring means for measuring the energy input to said first named means at a given amplitude of vibration of an element of the system.

2. In a device for measuring the thickness of a coating on a base material, in combination, a base designed to be placed on the coated material, a spring at one end clamped to the base and disposed over the coated material, a block fixed to the free end of the spring disposed to contact the coated material without any force, means for causing the spring and block mounted thereon to vibrate at the natural frequency of the spring and block combination, whereby the energy input to the first named means at a given amplitude of vibration of the block, as it strikes the coated material, is a measure of the thickness of the coating, and means for noting the magnitude of the energy input to said first named means at said given amplitude of vibration of the block.

3. In a device for measuring the thickness of a coating on a base material, in combination, a base designed to be placed on the coated material, a spring at one end clamped to the base and having a free end disposed over the coated material, a block fixed to the free end of the spring disposed to contact the coated material without any force, an adjustable weight on the free end of the spring for adjusting the natural period of vibration of the spring and the block and weight carried thereby, means for causing the spring and block mounted thereon to vibrate at the natural frequency of the spring and block combination, whereby the energy input to said first named means at a given amplitude of vibration of the block, as it strikes the coated material, is a measure of the thickness of the coating, and means for noting the magnitude of the energy input to said first named means at said given amplitude of vibration of the block.

4. In a device for measuring the thickness of a coating on a base material, in combination, a base designed to be placed against the coated material, a spring at one end rigidly secured to the base with the free end disposed over the coated material, a weight comprising a hammer of hard material secured to the free end of the spring and adapted to just touch the coating, means for vibrating the spring to cause the hammer to strike the coated material to produce a vibration of a given amplitude, and means for indicating a quantity that is a measure of the energy input to the spring to produce the vibration of a given amplitude.

5. In a device for measuring the thickness of a coating on a base material, in combination, a base designed to be placed against the coated material, a spring at one end rigidly secured to the base with the free end disposed over the coated material, a weight comprising a hammer of hard material secured to the free end of the spring and adapted to just touch the coating, an adjustable weight mounted on the free end of the spring for adjusting the natural period of vibration of the spring and weighting means carried thereby, means for vibrating the spring to cause the hammer to strike the coated material to produce a vibration of a given amplitude, and means for indicating a quantity that is a measure of the energy input to the spring to produce the vibration of a given amplitude.

6. A device for measuring the thickness of a coating on a base material, in combination, a mounting frame having a footing designed to be brought in firm contact with the coated material, a spring at one end rigidly secured to the frame and so disposed that the free end extends over the coated material, a weight comprising a hammer for striking the coated material rigidly secured to the free end of the spring and adapted to touch the coated material, an adjustable weight mounted on the free end of the spring, a magnetic armature carried by the spring intermediate its ends, the spring and the armature and weights carried near the free end comprising a vibratory system having a natural period of vibration that may be adjusted by the adjustable weight, an electromagnetic device including a magnetic circuit disposed in operative relation to the armature, and a coil for magnetizing the magnetic circuit, means for magnetizing the magnetic circuit with an alternating current corresponding to the natural frequency of the vibratory system whereby the vibratory system will vibrate with an amplitude that is determined by the thickness of the coating and the voltage of the alternating current supplied to said coil, means for increasing the voltage of the current supplied to the coil from a given minimum toward higher values until the amplitude of the vibrating system is a given magnitude, the increase in voltage of the current supplied to the coil being a measure of the thickness of the coating.

7. A device for measuring the thickness of a coating on a base material, in combination, a mounting frame having a footing designed to be brought in firm contact with the coated material, a spring at one end rigidly secured to the frame and so disposed that the free end extends over the coated material, a weight comprising a hammer for striking the coated material rigidly secured to the free end of the spring and adapted to touch the coated material, an adjustable weight mounted on the free end of the spring, a magnetic armature carried by the spring intermediate its ends, the spring and the armature and weights carried near the free end comprising a vibratory system having a natural period of vibration that may be adjusted by the adjustable weight, an electromagnetic device including a magnetic circuit disposed in operative relation to the armature, and a coil for magnetizing the magnetic circuit, means for magnetizing the magnetic circuit with an alternating current corresponding to the natural frequency of the vibratory system whereby the vibratory system will vibrate with an amplitude that is determined by the thickness of the coating and the voltage of the alternating current supplied to said coil, means for increasing the voltage of the current supplied to the coil from a given minimum toward higher values, a signal device actuated by an increase in amplitude of the vibrating system to a selected value, whereupon the increase in voltage of the current supplied to the coil is a measure of the thickness of the coating on the base material.

8. In a device for measuring the thickness of a coating on a coated material, in combination, a vibratory system including weighted spring means having a striker to strike the coated material, electric means for causing said striker to vibrate, said system being designed to have a given natural frequency and disposed against the coated material so that the striker when not caused to vibrate contacts the coated material without any force and when caused to vibrate strikes the coated material, whereby the vibration is damped as a function of the thickness of the coating material, and means for measuring the magnitude of the energy input to the striker for a given amplitude of vibration as the vibratory system vibrates at its natural frequency to thus determine the thickness of the coating material.

9. In a device for measuring the thickness of a coating on a coated material, in combination, a vibratory system including weighted spring means having a striker to strike the coated material and designed to have a given natural frequency and disposed against the coated material so that the striker when not caused to vibrate contacts the coated material without any force and when caused to vibrate strikes the coated material, whereby the vibration is damped as a function of the thickness of the coating material, means to cause said vibratory system to vibrate at its natural frequency, and means for measuring the magnitude of the energy input to said first named means as the vibratory system vibrates at a given amplitude and at its natural frequency to thus determine the thickness of the coating material.

10. In a device for measuring the thickness of a coating on a coated material, in combination, a vibratory system including weighted spring means having a striker to strike the coated material and designed to have a given natural frequency and disposed against the coated material so that the striker when not caused to vibrate contacts the coated material with substantially no force and when caused to vibrate strikes the coated material, whereby the vibration is damped as a function of the thickness of the coating material, an armature mounted on the vibratory system, electromagnetic means energized with an alternating current having a frequency corresponding to the natural frequency of the vibratory system and disposed in operative relation to said armature to thus cause said vibratory system to vibrate at its natural frequency, and means associated with said electromagnetic device for measuring the magnitude of the energy input to said electromagnetic means as the vibratory system vibrates at a given amplitude and at its natural frequency to thus determine the thickness of the coating material.

11. In a device for measuring the thickness of a coating on a coated material, in combination, a vibratory system including weighted spring means having a striker to strike the coated material and designed to have a given natural frequency and disposed against the coated material so that the striker when not caused to vibrate contacts the coated material with substantially no force and when caused to vibrate strikes the coated material whereby the vibration is damped as a function of the thickness of the coating material, an armature mounted on the vibratory system, electromagnetic means for actuating the armature, means for energizing the electromagnetic means with an alternating current having a frequency corresponding to the natural frequency of the vibratory system, means for changing the voltage of said current, and means for indicating the voltage change for producing a vibration of the vibratory system of a given amplitude, said voltage change being a measure of the thickness of the coating material.

12. In a device for measuring the thickness of a coating on a coated material, in combination, a vibratory system including weighted spring means having a striker to strike the coated material and designed to have a given natural frequency and disposed against the coated material so that the striker when not caused to vibrate contacts the coated material without substantially any force and when caused to vibrate strikes the coated material, whereby the vibration is damped as a function of the thickness of the coating material, an armature mounted on the vibratory system, electromagnetic means for actuating the armature, means for energizing the electromagnetic means with an alternating current having a frequency corresponding to the natural frequency of the vibratory system, means for varying the voltage of said current from zero to higher values, a signal operated when the amplitude of the vibration of the vibratory system, as the voltage is increased, has attained a given magnitude, and indicating means for indicating the magnitude of the voltage supplied to said electromagnetic means when said signal is caused to operate to thus show the thickness of the coating from the voltage increase.

JOSEPH SLEPIAN.
BERNARD F. LANGER.

REFERENCES CITED

The following references are of record in the file of this patent:

UNITED STATES PATENTS

| Number | Name | Date |
|---|---|---|
| 2,320,761 | Tait et al. | June 1, 1943 |

FOREIGN PATENTS

| Number | Country | Date |
|---|---|---|
| 443,485 | Great Britain | Feb. 26, 1936 |